(12) United States Patent
Bakker

(10) Patent No.: US 12,491,742 B1
(45) Date of Patent: Dec. 9, 2025

(54) VEHICLE SUSPENSION SYSTEMS, RETROFIT KITS, AND METHODS OF RETROFITTING VEHICLE SUSPENSIONS

(71) Applicant: Cody Bakker, Fallon, NV (US)

(72) Inventor: Cody Bakker, Fallon, NV (US)

( * ) Notice: Subject to any disclaimer, the term of this patent is extended or adjusted under 35 U.S.C. 154(b) by 0 days.

(21) Appl. No.: 19/218,874

(22) Filed: May 27, 2025

Related U.S. Application Data

(60) Provisional application No. 63/656,190, filed on Jun. 5, 2024.

(51) Int. Cl.
B60G 9/00 (2006.01)

(52) U.S. Cl.
CPC ...... B60G 9/003 (2013.01); *B60G 2200/1324* (2013.01); *B60G 2200/341* (2013.01); *B60G 2202/12* (2013.01); *B60G 2202/152* (2013.01); *B60G 2204/143* (2013.01); *B60G 2204/4302* (2013.01); *B60G 2206/911* (2013.01)

(58) Field of Classification Search
CPC ............ B60G 9/003; B60G 2200/1324; B60G 2200/341; B60G 2202/12; B60G 2202/152; B60G 2204/143; B60G 2204/4302; B60G 2206/911
See application file for complete search history.

(56) References Cited

U.S. PATENT DOCUMENTS

| | | | |
|---|---|---|---|
| 4,465,300 A * | 8/1984 | Raidel, Sr. ............. | B60G 9/003 280/124.179 |
| 4,518,171 A | 5/1985 | Hedenberg | |
| 4,802,690 A * | 2/1989 | Raidel .................... | B60G 9/003 280/124.157 |
| 8,371,596 B2 * | 2/2013 | Johnson ................. | B60G 9/022 280/124.157 |
| 8,870,203 B2 * | 10/2014 | Legros ................... | B60G 11/28 280/124.112 |
| 11,491,838 B2 * | 11/2022 | Pereira Lemos ...... | B60G 15/12 |
| 11,970,033 B2 * | 4/2024 | Oishi ................. | B60G 17/0525 |
| 2004/0056446 A1 | 3/2004 | Dudding et al. | |
| 2004/0155425 A1 | 8/2004 | Schluntz | |
| 2011/0175317 A1 | 7/2011 | Legros | |
| 2019/0061847 A1 * | 2/2019 | Barton ..................... | B60G 5/04 |
| 2024/0051365 A1 | 2/2024 | Oishi | |

OTHER PUBLICATIONS

International Search Report and Written Opinion for related application PCT/US2025/031152, dated Sep. 18, 2025, 14 pages.

* cited by examiner

*Primary Examiner* — Faye M Fleming
(74) *Attorney, Agent, or Firm* — Fennemore Craig, P.C.

(57) ABSTRACT

A retrofit kit for replacing an existing leaf spring suspension system, methods of replacing the existing leaf spring suspension systems, and suspension systems may include an upper load beam having a proximal end and a distal end, the distal end being configured to pivotally mount to a vehicle. A lower control arm includes a proximal end, a distal end, and a mounting location positioned between the proximal end distal ends. The distal end of the lower control arm is configured to pivotally engage a leaf spring mounting eye provided on the vehicle. The mounting location on the lower control arm is configured to pivotally receive the proximal end of the upper load beam.

21 Claims, 7 Drawing Sheets

VEHICLE SUSPENSION SYSTEMS, RETROFIT KITS, AND METHODS OF RETROFITTING VEHICLE SUSPENSIONS

CROSS-REFERENCE TO RELATED APPLICATION

This application claims the benefit of U.S. Provisional Patent Application No. 63/656,190, filed on Jun. 5, 2024, which is hereby incorporated herein by reference for all that it discloses.

TECHNICAL FIELD

The disclosed instrumentalities relate to vehicle suspension systems and general and more specifically to retrofit kits for leaf spring suspension systems.

BACKGROUND

Leaf spring suspension systems have been in use for over 100 years due to their reliability and simplicity in operation and manufacturing. Leaf spring suspension systems control the drive axle of a vehicle with fewer components compared to other suspension systems. Leaf springs can twist longitudinally, flex up and down, and do not move transversely to the vehicle, allowing the drive axle to accommodate elevation changes in the terrain and stay centered under the vehicle. Leaf spring suspension systems do have deficiencies that cause occupant discomfort and mechanically accelerated wear.

For a vehicle to be able to carry a load in addition to its own weight, leaf springs need to have a spring rate that is high enough to compensate for any additional load placed in the vehicle and keep the vehicle stable at the same time. The high spring rate when the vehicle is unloaded causes the vehicle to ride too firm for comfort of the driver and passengers. A leaf spring suspension system can have a linear or progressive spring rate, but the spring rate is not fully adjustable and cannot be fine-tuned to the load and weight of the vehicle on demand.

Leaf spring suspension systems also do not keep the drive angle of the drive axle pinion and drive shaft in alignment during acceleration or deceleration events. This is commonly known as axle-wrap. A leaf spring drive axle is always transversely mounted to the vehicle. The torque applied to the drive axle from the drive train, or the force applied from the brakes on the drive axle, causes the axle to roll up towards the back of the vehicle, or down towards the front of the vehicle. This axle-wrapping motion accelerates wear on components of the drive train and causes inconsistencies in vehicle responsiveness during operation.

SUMMARY

One embodiment of a retrofit kit for replacing an existing leaf spring suspension system may include an upper load beam having a proximal end that defines first and second mounting locations that are positioned spaced-apart relation. A distal end of the upper load beam is configured to pivotally mount to a first location on the vehicle. A lower control arm defines a mounting location between respective proximal and distal ends that is configured to pivotally engage the first mounting location of the upper load beam. The proximal end of the lower control arm is configured to pivotally mount to a first location on the beam axle of the vehicle, whereas the distal end of the lower control arm is configured to pivotally mount to a second location on the vehicle. A proximal end of an axle wrap control arm is configured to pivotally mount to a second location on the beam axle of the vehicle, whereas a distal end of the axle wrap control arm is configured to pivotally engage the second mounting location of the upper load beam.

Also disclosed is a method of retrofitting an existing leaf spring suspension system that may include: Removing from the vehicle and the beam axle a right side leaf spring of the existing leaf spring suspension system; pivotally mounting a proximal end of a first lower control arm to a right side of the beam axle; pivotally mounting a distal end of the first lower control arm to a right side mounting eye provided on the vehicle; pivotally mounting a proximal end of a first axle wrap control arm to a right side of the beam axle; pivotally mounting a first mounting location defined by a proximal end of a first upper load beam to the first lower control arm at a position between the proximal end and the distal end of the first lower control arm; pivotally mounting a second mounting location defined by the proximal end of the first upper load beam to a distal end of the first axle wrap control arm; pivotally mounting a distal end of the first upper load beam to a first end of a first shackle, a second end of the first shackle being pivotally mounted to a right side shackle mount provided on the vehicle; and mounting a first spring member between the beam axle and the first upper load beam.

A suspension system for mounting a beam axle to a vehicle is also disclosed that may include a right side lower control arm having a proximal end, a distal end, and a mounting location positioned between the proximal and distal ends. The proximal end of the right side lower control arm is pivotally mounted to a right side of the beam axle, whereas the distal end of the right side lower control arm is pivotally mounted to a right side mounting eye provided on the vehicle. A proximal end of a right side upper load beam is pivotally mounted to the mounting location of the right side lower control arm. A first end of a right side shackle is pivotally mounted to the distal end of the right side upper load beam, whereas a second end of the right side shackle is pivotally mounted to a right side shackle mount provided on the vehicle. A right side spring member is mounted to the right side of the beam axle and the right side upper load beam. Similarly, a proximal end of a left side lower control arm is pivotally mounted to a left side of the beam axle, whereas a distal end of the left side lower control arm is pivotally mounted to a left side mounting eye provided on the vehicle. A proximal end of a left side upper load beam is pivotally mounted to a mounting location of the left side lower control arm that is located between the proximal and distal ends of the left side control arm. A first end of a left side shackle is pivotally mounted to the distal end of the left side upper load beam, whereas a second end of the left side shackle is pivotally mounted to a left side shackle mount provided on the vehicle. A left side spring member is mounted to the left side of the beam axle and the left side upper load beam.

BRIEF DESCRIPTION OF THE DRAWINGS

Illustrative and presently preferred exemplary embodiments of the disclosed instrumentalities are shown in the drawings in which.

DETAILED DESCRIPTION OF THE PREFERRED EMBODIMENTS

The following is a detailed description of exemplary embodiments that illustrate the principles of the disclosed instrumentalities. While the embodiments are provided to illustrate various aspects of the disclosed instrumentalities, the disclosed instrumentalities should not be regarded as limited to any particular embodiment or combination of features. Moreover, the disclosed instrumentalities teach by way of example and not by limitation. Therefore, the scope of the disclosed instrumentalities should be regarded as encompassing numerous alternatives, modifications, and equivalents to those shown and described herein.

The adjustable spring rate vehicle suspension system according to the disclosed instrumentalities may be provided as a retrofit kit and may be used to replace a leaf spring suspension system in vehicles designed for leaf spring suspension systems. In other embodiments, the adjustable rate vehicle suspension system may be implemented on vehicles designed for leaf spring suspension systems, but installed instead of the leaf spring suspension system. In any event, the adjustable rate vehicle suspension system (e.g., provided as a retrofit kit or as it may be used anew on a vehicle) according to the disclosed instrumentalities allows the operator of the vehicle to adjust and fine-tune the spring rate of the suspension system for any of a wide range of loading situations. The adjustability of the vehicle suspension system provides for improved vehicle suspension system performance and occupant comfort over a wide range of driving and vehicle use conditions.

Figure 1:
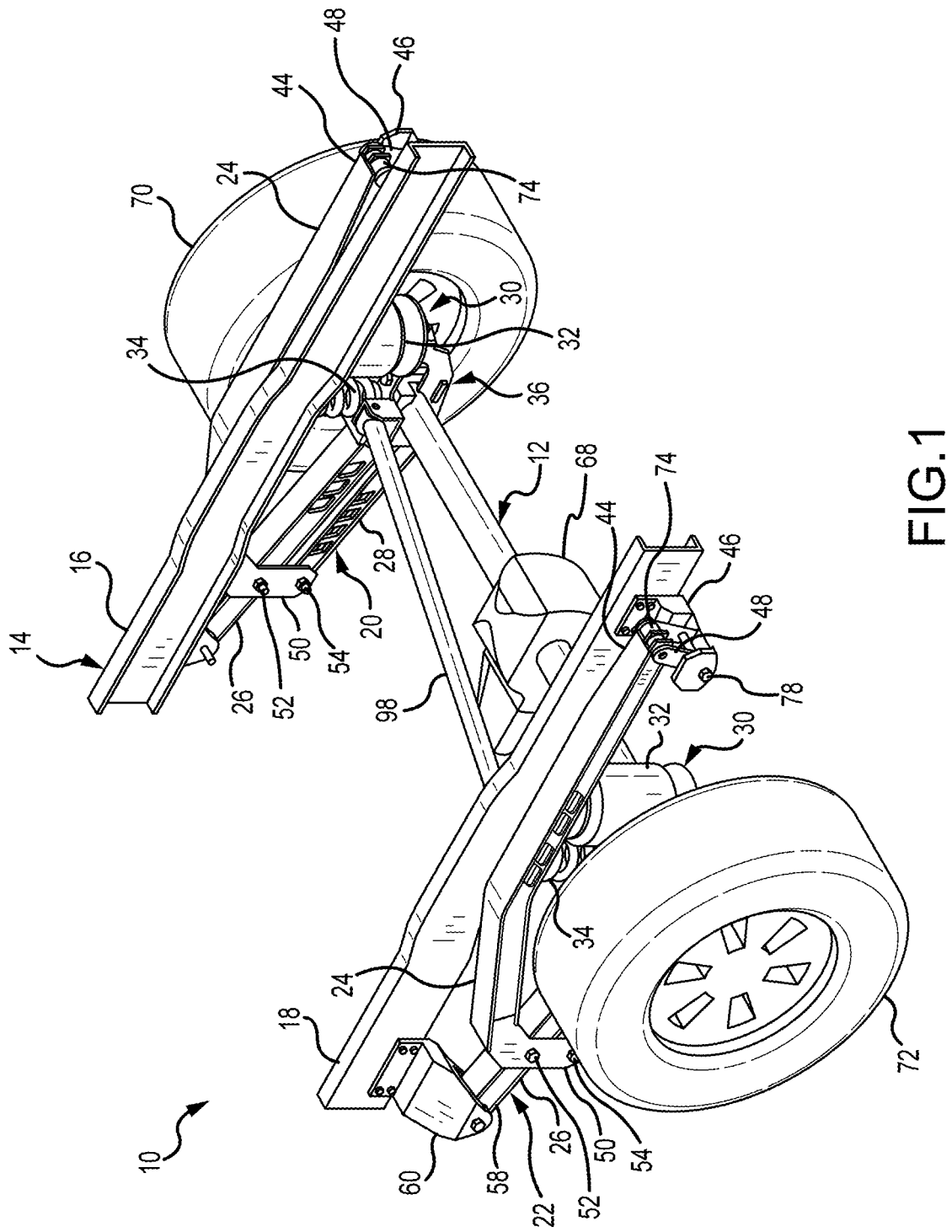
FIG. 1 is a perspective view of one embodiment of a variable spring rate suspension system shown as it may be retro-fitted to a vehicle frame assembly configured for a leaf spring suspension system.
Figure 2:
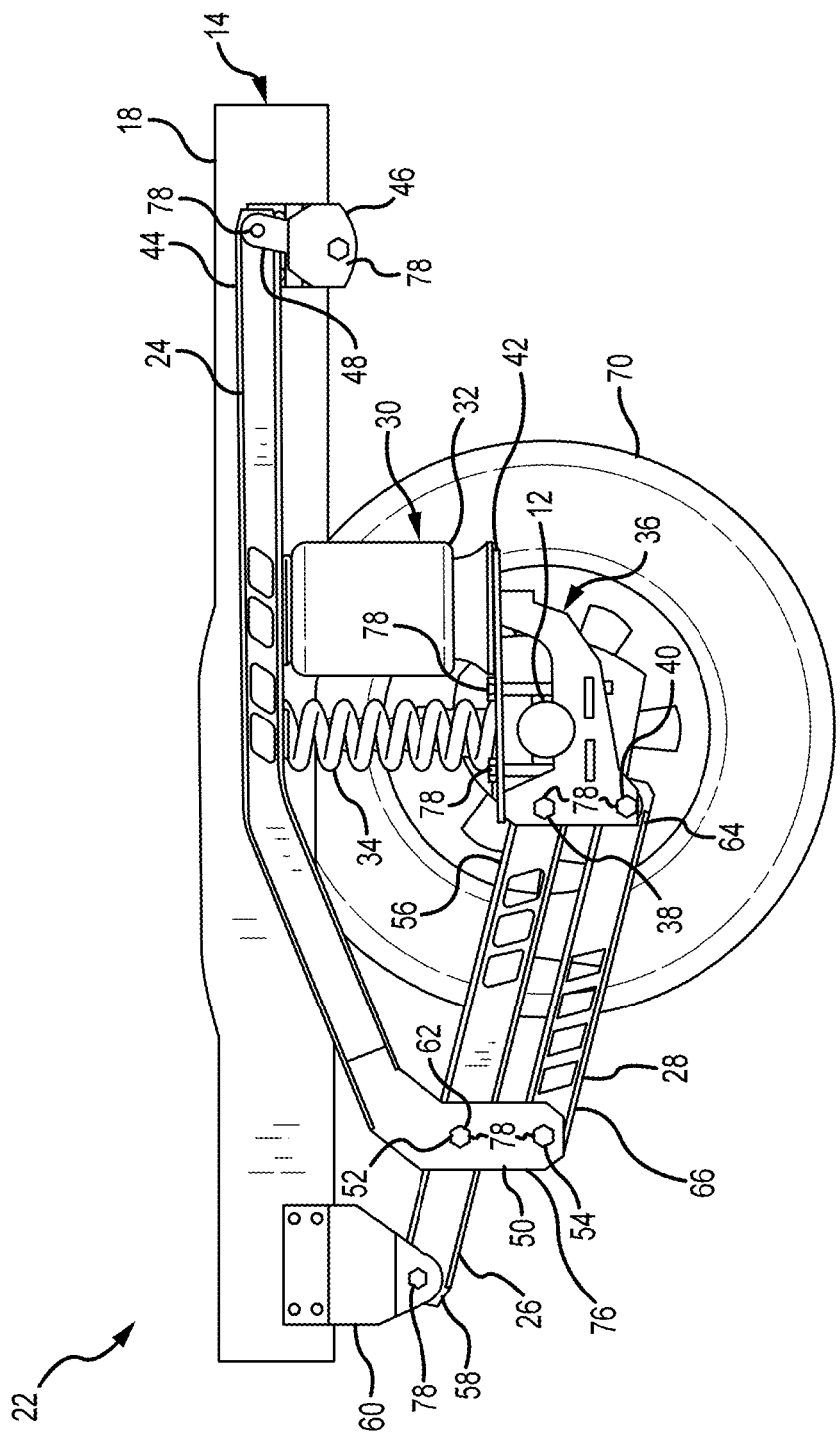
FIG. 2 is an outboard side view in elevation of the suspension system illustrated in FIG. 1 with the left side road wheel removed to more clearly show various components of the left side suspension assembly.

Referring now to FIGS. 1 and 2, a first embodiment 10 of an adjustable spring rate vehicle suspension system is shown and described herein as it may be used to replace a leaf spring suspension system on a vehicle having a solid or rigid rear axle, referred to herein as a beam axle 12, configured to be mounted to or supported by a ladder-type frame system 14 of a vehicle. Vehicle frame system 14 may include a right side frame rail 16 and a left side frame rail 18, portions of which may be positioned in generally parallel, spaced-apart relation, as best seen in FIG. 1. Adjustable rate suspension system 10 may comprise respective right and left side suspension assemblies 20 and 22 that are used to mount respective right and left sides of beam axle 12 to right and left side frame rails 16 and 18. In the particular embodiments shown and described herein, right and left side suspension assemblies 20 and 22 may be substantially identical, thereby allowing identical suspension assemblies (e.g., right and left side suspension assemblies 20 and 22) to be used on either side of the vehicle. However, in other embodiments, the right and left side suspension assemblies 20 and 22 may comprise one or more components that are specifically configured or adapted to be used on a particular side of the vehicle, e.g., either the right or left side of the vehicle, as the case may be.

In embodiments wherein the right and left side suspension assemblies 20 and 22 are substantially identical, each suspension assembly 20 and 22 may comprise an upper load beam 24, a lower control arm 26, and an axle wrap control arm 28. Each suspension assembly 20 and 22 may also comprise at least one spring member 30 that, in some embodiments, is generally disposed or positioned between beam axle 12 and upper load beam 24, as best seen in FIG. 2. Spring member 30 may comprise an airbag 32, the stiffness of which may be adjusted or varied by adjusting or varying the internal pressure of the gas (e.g., air) provided within airbag 32. In some embodiments, spring member 30 may also comprise a coil spring 34. In still yet other embodiments, spring member 30 may comprise both airbag 32 and coil spring 34, as shown in FIGS. 1 and 2.

In the particular embodiments shown and described herein, each suspension assembly 20 and 22 may also include an axle mount assembly 36. Axle mount assembly 36 mounts to beam axle 12 and provides mounting locations for at least one of lower control arm 26, axle wrap control arm 28, and spring member 30. More specifically, axle mount assembly 36 may define first and second mounting locations 38 and 40 that are positioned in spaced-apart relation, as best seen in FIG. 2. Axle mount assembly 36 may also define a spring seat 42 suitable for receiving one or more spring members 30, such as airbag 32 and/or coil spring 34.

The various members comprising each suspension assembly may be mounted or connected together to form each of right and left side suspension assemblies 20 and 22. Right and left side suspension assemblies 20 and 22 are then mounted or connected to beam axle 12 and vehicle frame system 14. More specifically, and with reference now primarily to FIG. 2 and with occasional reference to FIG. 1, a distal end 44 of upper load beam 24 may be mounted to vehicle frame system 14 (e.g., frame rail 16) via a shackle mount 46 provided on frame system 14 (e.g., frame rail 16) and a shackle 48. A proximal end 56 of lower control arm 26 may be pivotally mounted to first mounting location 38 defined by axle mount assembly 36, whereas a distal end 58 of lower control arm 26 may be pivotally mounted to a mounting eye 60 provided on frame system 14 (e.g., frame rail 16). A mounting location 62 defined by lower control arm 26 at a position between proximal and distal ends 56 and 58 of lower control arm 26 may be pivotally mounted to a first mounting location 52 defined by proximal end 50 of upper load beam 24. A proximal end 64 of axle wrap control arm 28 may be pivotally mounted to second mounting location 40 defined by axle mount assembly 36. A distal end 66 of axle wrap control arm 28 may be pivotally mounted to a second mounting location 54 defined by proximal end 50 of upper load beam 24.

As will be described in much greater detail below, the various components of each right and left side suspension assembly 20 and 22, as well as the relationships between the various mounting locations (i.e., pivot points), may be selected and configured to control vertical, lateral, and torsional (i.e., rotational) movement of beam axle 12 and provide the desired mechanical advantage the forces applied by spring members 30 to oppose vehicle weight forces, both static and dynamic.

The adjustable spring rate axle control suspension system is designed to replace leaf spring suspension systems to provide improved ride quality, adjustability of spring rate, maintain the pinion and driveline at correct operating angles, and prevent axle wrap from occurring.

One advantage of the adjustable rate suspension system according to the disclosed instrumentalities is that the spring rate of the system may be readily adjusted (e.g., by varying the pressure in airbags 32) to compensate for different weight carrying capacity scenarios, thereby delivering improved ride quality, comfort, and suspension performance over a wide range of vehicle loading conditions. For example, at reduced vehicle loads, the pressure within airbags 32 may be reduced, thereby providing improved ride quality. As the vehicle is loaded with weight up to the maximum GVWR of the vehicle, the spring rate can be increased by increasing the pressure within airbags 32 to properly handle the increased load.

Another advantage of the suspension system according to the disclosed instrumentalities is that it provides for much improved control of axle wrap (e.g., due to acceleration and deceleration forces) compared with conventional leaf-spring suspension systems. Moreover, the geometrical arrangement of the various components of the suspension system maintains axle rotation (e.g., pinion angle) at a substantially fixed value throughout substantially the entirety of axle movement. This keeps the drive shaft balanced and running smoothly for better performance, reliability, and comfort for the vehicle and its occupants.

Another advantage of the adjustable rate suspension system is that it provides for improved mechanical advantage of spring member 30. As will be described in further detail below, the mechanical advantage over spring member 30 may be varied by changing the longitudinal position of mounting location 62 defined by lower control arm 26. The mechanical advantage over spring member 30 means that axle travel is not limited by spring travel. Therefore, vertical movement of beam axle 12 may be significantly greater than vertical movement of spring member 30. Increased axle movement improves the ability of the vehicle to traverse rugged and harsh terrain, while also improving occupant comfort and vehicle stability.

Having briefly described one embodiment of the adjustable rate suspension system according to the disclosed instrumentalities, as well as some of its more significant features and advantages, various embodiments and alternative arrangements of the vehicle suspension system will now be described in detail. However, before proceeding with the description, it should be noted that while the various embodiments of the adjustable rate suspension system are shown and described herein as they could be used to replace a leaf spring suspension system (not shown) provided on a vehicle having a ladder-type frame system, the disclosed instrumentalities could be used in conjunction with a wide variety of vehicles having any of a wide variety of frame types (e.g., uni-body frame types) having mounting locations designed for leaf spring suspension systems. Moreover, the disclosed suspension systems should not be regarded as limited to replacement or retro-fit type situations wherein an existing leaf spring suspension system is replaced with the adjustable rate suspension system, but instead could also be used on new or modified vehicles that were never provided with a leaf spring suspension system. Consequently, the disclosed instrumentalities should not be regarded as limited to the particular vehicles, suspension system configurations, and applications shown and described herein.

Referring back now to FIGS. 1 and 2, one embodiment of an adjustable spring rate vehicle suspension system 10 is shown and described herein as it may be used to replace a leaf spring suspension system for supporting a beam axle 12. In the particular embodiments shown and described herein, beam axle 12 may comprise a driven axle having a final drive (e.g., ring and pinion) and differential assembly provided within a housing or differential carrier 68 located in the middle portion of beam axle 12. The final drive and differential assembly may be operatively connected to a suitable engine and transmission system (not shown) by a drive shaft (also not shown) provided with one or more universal or constant-velocity joints, as is well-known, to accommodate relative movement between beam axle 12 and the engine/transmission system. Separate axle shafts (also not shown) provided within beam axle 12 transmit rotational driving forces (i.e., torque) to right and left road wheels 70 and 72. Alternatively, beam axle 12 could comprise an un-driven beam axle that simply supports road wheels that are not driven by the engine/transmission system. In addition to being driven or un-driven, beam axle 12 may also comprise a front or even intermediate vehicle axle (e.g., on vehicles having 2 or more rear axles). Beam axle 12 may also comprise a steerable axle in which the road wheels are pivotally mounted to the beam axle 12 to provide a vehicle steering function.

In any event, and regardless of whether beam axle 12 is driven or un-driven or comprises a steerable axle, the adjustable rate vehicle suspension system 10 may comprise respective right and left side suspension assemblies 20 and 22. As briefly mentioned above, and in the particular embodiments shown and described herein, the right and left side suspension assemblies 20 and 22 are configured to mount to a vehicle having a ladder-type frame system 14 that includes right and left side frame rails 16 and 18, at least portions of which are positioned in generally parallel, spaced-apart relation, as best seen in FIG. 1. Alternatively, frame system 14 could comprise other types of vehicle body support systems, such as uni-body systems, suitable for supporting a leaf-spring suspension system. Consequently, the disclosed instrumentalities should not be regarded as limited to use with vehicles having ladder-type frame systems 14.

Right and left side suspension assemblies 20 and 22 may be substantially identical, thereby allowing identical suspension assemblies to be used on the right and left side of the vehicle. However, in other embodiments, the right and left side suspension assemblies 20 and 22 may comprise one or more components that are specifically configured or adapted to be used on a particular side of the vehicle, e.g., either the right or left side of the vehicle, as the case may be. Some of those components are described below, while others would become apparent to persons having ordinary skill in the art after having become familiar with the teachings provided herein. Consequently, the disclosed instrumentalities should not be regarded as limited to right and left side suspension assemblies 20 and 22 that are identical in all respects.

Figure 3:
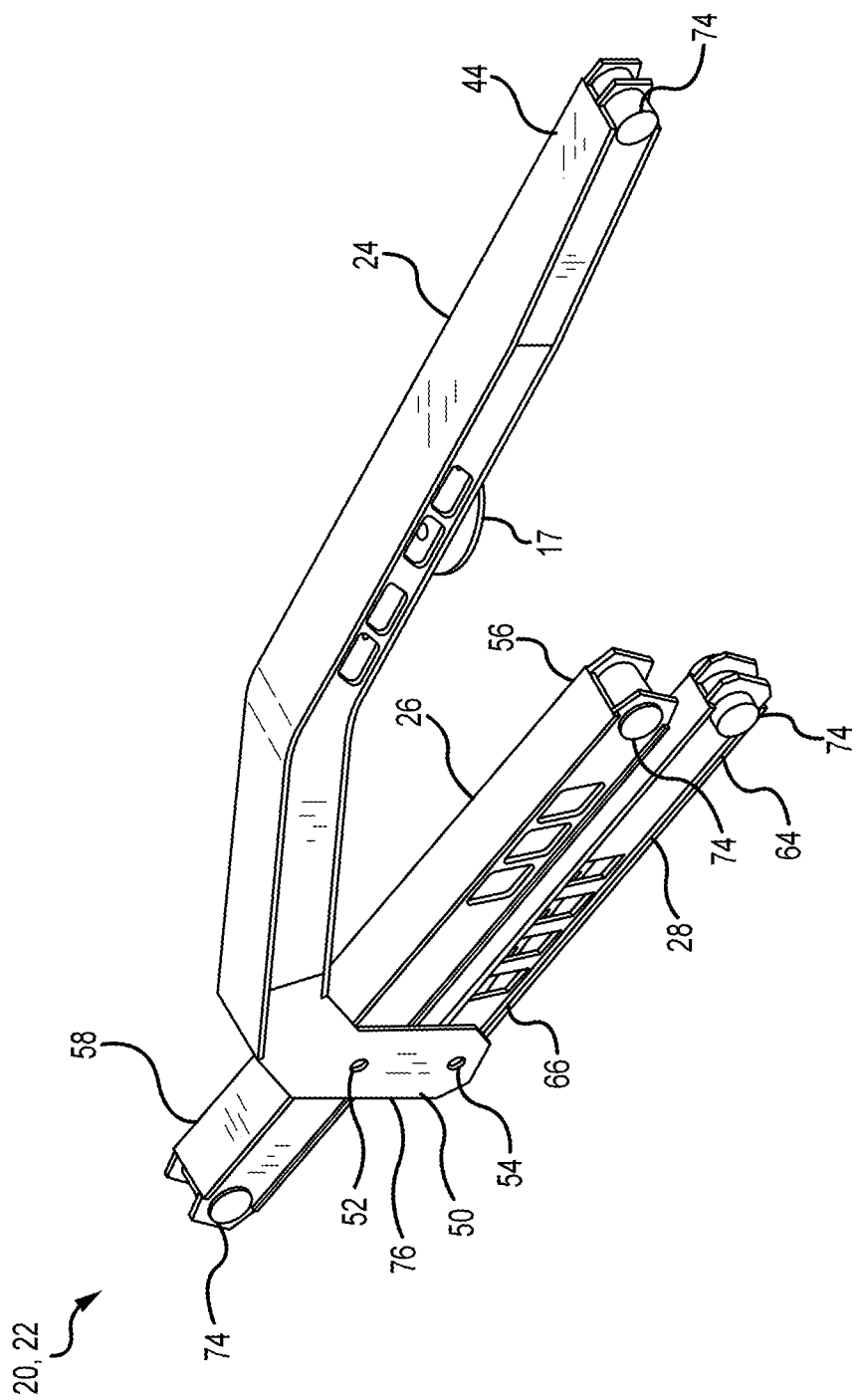
FIG. 3 is an enlarged perspective view of the upper load beam, lower control member, and axle wrap control member of the left side suspension assembly.
Figure 4:
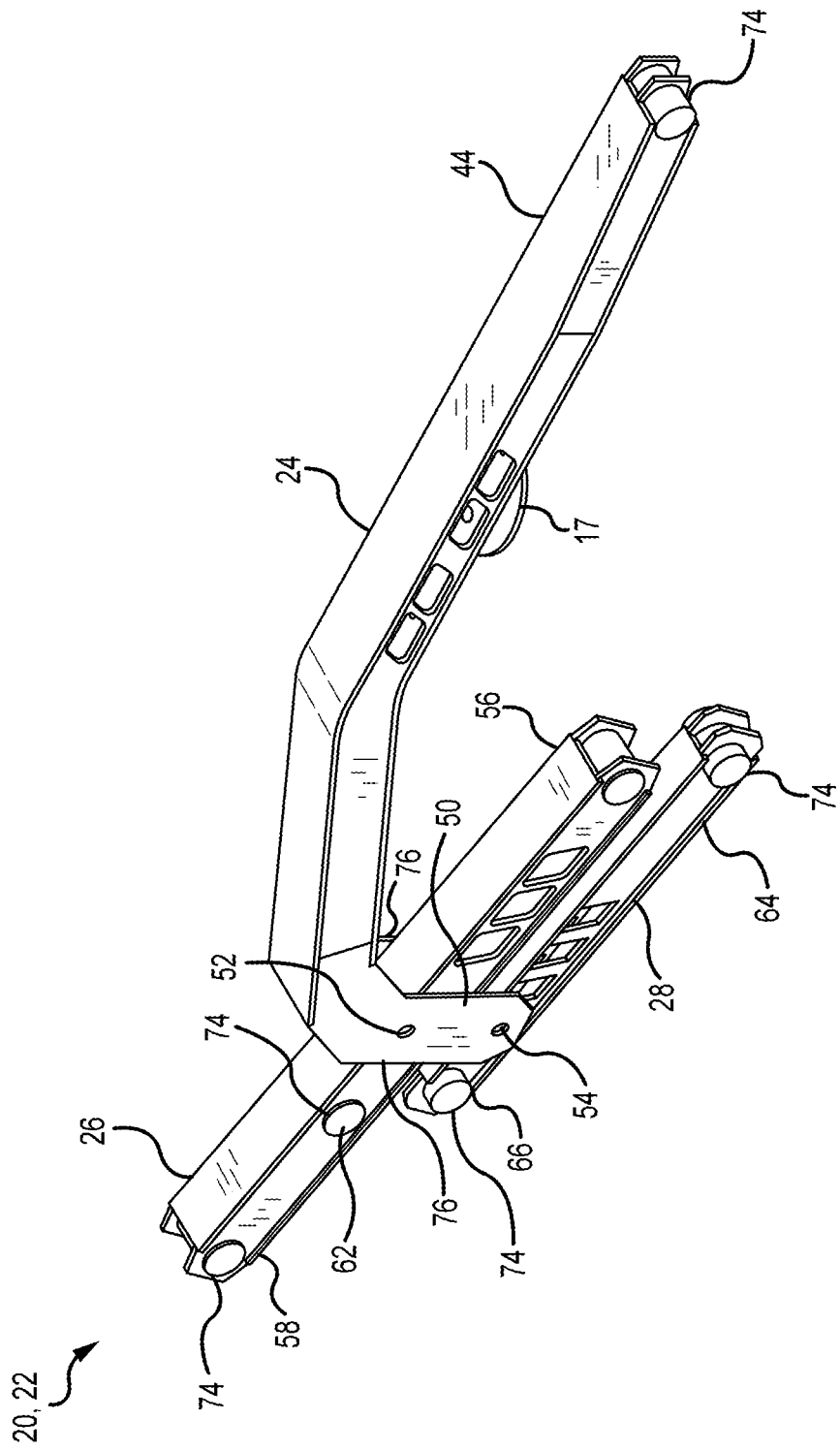
FIG. 4 is a partially exploded perspective view of the components of the left side suspension assembly illustrated in FIG. 3 to more clearly show the intermediate mounting location defined by the lower control member.

With reference now primarily to FIGS. 2-4, each suspension assembly 20 and 22 may comprise an upper load beam 24, a lower control arm 26, and an axle wrap control arm 28 that are operatively, e.g., pivotally connected to one another in the manner shown and described herein. However, before proceeding with the description it should be noted that while the pivotal mounting of the various members may allow them to pivot about a single axis, one or more of the elements may be pivotally mounted to one another so that they may pivot about 2 axes. Single axis pivoting arrangements may be facilitated by the use of a pivot pin (such as bolts 78) sized for rotation within a bushing (such as bushings 74). Two axes pivoting arrangements may be facilitated by the use of ball joints or spherical bearings (not specifically shown herein). Consequently, as used herein the terms 'pivot' and 'pivotally mounted' should be regarded as encompassing both single axis and multiple axes pivotal mounting arrangements.

Proceeding now with the description, upper load beam 24 may comprise a generally elongate member having a distal end 44 and a proximal end 50. In some embodiments, upper load beam 24 may also include one or more spring seats 17 sized and configured to receive spring member(s) 30. Upper load beam 24 may be substantially straight or curved (i.e., arched) depending on the geometry and frame design of the particular vehicle on which it is to be used, as would become apparent to persons having ordinary skill in the art after having become familiar with the teachings provided herein. Consequently, the disclosed instrumentalities should not be regarded as limited to an upper load beam 24 having any particular shape or configuration. However, by way of example, and in the particular embodiments shown and described herein, the rear portion of upper load beam 24 is substantially straight, while the front portion is angled downwardly toward proximal end 50 to allow proximal end 50 to be mounted to lower control arm 26 and axle wrap control arm 28.

Distal end 44 of upper load beam 24 may be provided with a bushing 74 to allow it to be pivotally mounted to shackle mount 46 via shackle 48, as best seen in FIG. 2. The pivotal mounting of distal end 44 and shackle 48 may be accomplished via a bolt 78 sized to be received by bushing 74. Shackle 48 may be angled in any manner, and may be either upright or inverted with respect to shackle mount 46, depending on the particular vehicle geometry involved (e.g., configuration of shackle mount 46), as would become apparent to persons having ordinary skill in the art in view of the particular vehicle involved.

Proximal end 50 of upper load beam 24 defines first and second mounting locations 52 and 54 that are located in spaced-apart relation. As will be described in further detail below, lower control arm 26 is pivotally mounted to first mounting location 52, whereas axle wrap control arm 28 is pivotally mounted to second mounting location 54. In the particular embodiments shown and described herein, proximal end 50 of upper load beam 24 may comprise a pair of plates 76 positioned in generally parallel, spaced-apart relation, as best seen in FIG. 4. First and second mounting locations 52 and 54 may be defined by corresponding holes provided in plates 76 that are sized to receive corresponding bolts 78, as best seen in FIG. 2. Alternatively, other mounting arrangements could be used.

Still referring to FIGS. 2-4, lower control arm 26 may comprise a generally elongate member having a proximal end 56 and a distal end 58. Lower control arm 26 may comprise a generally straight member, as shown herein, although it need not be, depending on the configuration of the particular vehicle involved and other factors that would become apparent to persons having ordinary skill in the art. Proximal and distal ends 56 and 58 lower control arm 26 may be provided with suitable bushings 74 to allow lower control arm 26 to be pivotally mounted, e.g., by bolts 78, to first mounting location 38 defined by axle mount assembly 36 and to mounting eye 60 provided on frame system 14. See FIG. 2.

As briefly mentioned above, lower control arm 26 also defines a mounting location 62 located between proximal and distal ends 56 and 58. Mounting location 62 is configured to pivotally mount or connect to first mounting location 52 defined by proximal end 50 of upper load beam 24. More specifically, mounting location 62 may be provided with a bushing 74. Bolt 78 sized to be received by bushing 74 pivotally connects mounting location 62 of lower control arm 26 to first mounting location 52 defined by proximal end 50 of upper load beam 24. In this regard it should be noted that mounting location 62 may be located anywhere along the length of lower control arm 26 to change the leverage or force applied to spring member 30 during suspension movement. Therefore, the longitudinal location (i.e., location between proximal and distal ends 56 and 58) of mounting location 62, together with the stiffness of spring member 30, may be used to vary or adjust the overall spring rate of suspension system 10.

Axle wrap control arm 28 may also comprise a generally elongate member having a proximal end 64 and a distal end 66. Axle wrap control arm 28 reduces or eliminates axle wrap or rotation due to drive or braking forces, thereby minimizing changes in differential pinion angle with suspension movement (i.e., in embodiments wherein beam axle 12 comprises a driven axle). Axle wrap control arm 28 may comprise a generally straight member, as shown herein, although it need not be straight. Proximal and distal ends 64 and 66 of axle wrap control arm 28 may be provided with suitable bushings 74 to allow axle wrap control arm 28 to be pivotally mounted, e.g., by bolts 78, to second mounting location 40 defined by axle mount assembly 36 and second mounting location 54 defined by proximal end 50 of upper load beam 24.

In some embodiments, the overall length of axle wrap control arm 28, i.e., the distance between proximal and distal ends 64 and 66, may be adjustable to allow the pinion angle of differential carrier 68 to be maintained within a desired specification. In such an embodiment, one or both of proximal and distal ends 64 and 66 may be threadably engaged with axle wrap control arm 28. The distance between proximal and distal ends 64 and 66 may then be changed by rotating the proximal and/or distal ends 64 and 66 of axle wrap control arm 28 to bring them either closer together or further apart, as the case may be. Alternatively, one or more of the axle mount assemblies 36 and proximal end 50 of upper load beam 24 may be provided with alternative or even multiple different mounting locations (e.g., holes) to be used in place of regular or standard mounting locations 40 and 54, respectively. The pinion angle may then be changed by mounting axle wrap control arm 28 to different mounting locations. In still yet another alternative, a cam-type mounting arrangement (e.g., utilizing cam bolts) may be used to change the pinion angle, as would become apparent to persons having ordinary skill in the art after having become familiar with the teachings provided herein. Consequently, the disclosed instrumentalities should not be regarded as limited to any particular arrangement or method of changing the pinion angle.

Upper load beam 24 and lower control arm 26 mount directly in place of the original leaf spring. The interconnection of upper load beam 24 and lower control arm 26 recreates the motion of the original leaf spring but allows beam axle 12 to travel further up and down than spring member 30 due to the mechanical advantage created by the combination of upper load beam 24 and lower control arm 26. Location of the various pivot points or mounting locations of upper load beam 24 and lower control arm 26 may be varied to vary the performance of suspension system 10 to meet any of a wide range of objectives, as would become apparent to persons having ordinary skill in the art after having become familiar with the teachings provided herein. As mentioned, axle wrap control arm 28 controls the rotation or wrapping motion of beam axle 12, thereby improving performance and preventing unwanted delays in responsiveness during acceleration or deceleration of the vehicle.

Upper load beam 24, lower control arm 26, and axle wrap control arm 28 may be fabricated from any of a wide range of materials and fabrication processes now known in the art or that may be developed in the future that are (or would be) capable of providing the various members 24, 26, and 28 with the desired levels of strength and rigidity to minimize strain or flexure of the various members 24, 26, and 28 during expected suspension travel and loadings. As such, the various members 24, 26, and 28 may comprise any of a wide range of cross-sectional configurations (e.g., a cross-sectional configuration in the shape of an "I") and may be made from any of a wide range of materials and fabrication techniques.

For example, in some embodiments, members 24, 26, and 28 may comprise built-up structures or weldments fabricated from individual pieces of material (e.g., steel) that are welded together to form the various members 24, 26, and 28. In other embodiments, the various members 24, 26, and 28 may be formed by stamping, forging, or casting, again from any of a wide range of materials now known in the art or that may be developed in the future that are, or would be, suitable for the particular application. Still other materials, material combinations, and fabrication techniques could be used, as would become apparent to persons having ordinary skill in the art after having become familiar with the teachings provided herein. Consequently, the disclosed instrumentalities should not be regarded as limited to members 24, 26, and 28 having any particular shapes or cross-sectional configuration nor made from any particular material or forming process.

Referring back now primarily to FIG. 2, each suspension assembly 20 and 22 may also comprise at least one spring member 30. Spring member 30 may comprise one or more of an airbag 32, coil spring 34, shock absorber, or air shock, either alone or in combination. The spring rate or stiffness of suspension system 10 may be adjusted or varied by adjusting or varying the internal pressure of the gas (e.g., air) provided within airbag 32. Generally speaking, higher airbag pressures will be desired for heavier loads. Conversely, lower airbag pressures will be desired for lighter loads to provide improved suspension compliance and rideability. In some embodiments, spring member 30 may also comprise coil spring 34, which may be used in combination with airbag 32 to provide increased stiffness, load carrying capacity, and/or a baseline spring rate for low airbag inflation pressures. Spring member 30 may also comprise one or more shock absorbers or air shocks (not specifically shown) to provide the desired degree of damping.

Figure 5:
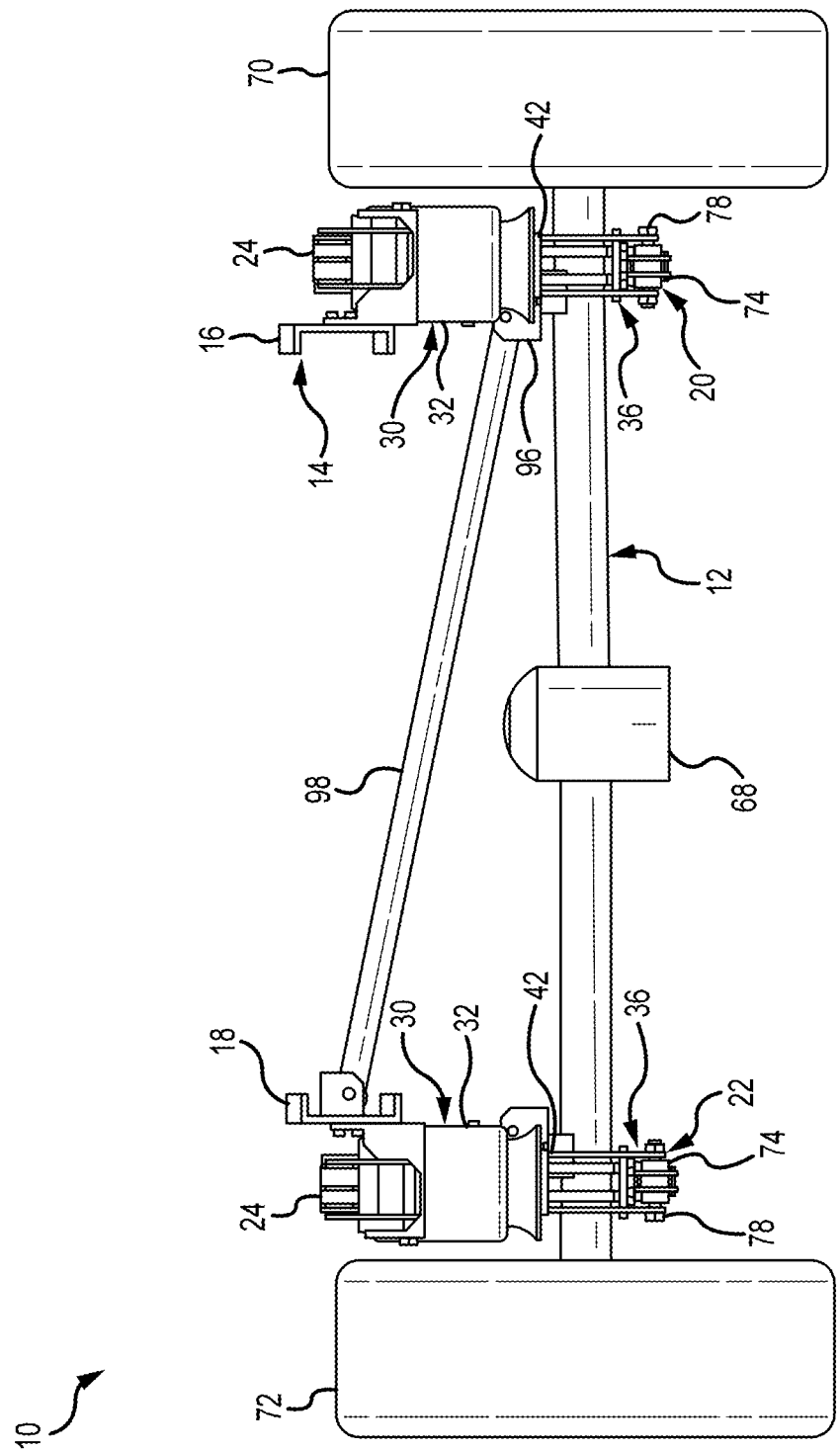
FIG. 5 is a rear view in elevation of the suspension system illustrated in FIG. 1.

Spring member 30 may be generally disposed or positioned between beam axle 12 and upper load beam 24 and provides an opposing force to bias upper load beam 24 away from beam axle 12. The loads are thereby transferred to and from vehicle frame system 14 via the same mounting locations (e.g., shackle mount 46 and mounting eye 60) used by the leaf spring suspension system. In some embodiments, spring member 30 is mounted between upper load beam 24 and upper mounting plate 94 of axle mount assembly 36, as best seen in FIGS. 1, 2, and 5. Alternatively, in other embodiments, axle mount assembly 36 may be configured so that a lower portion of spring member 30 is positioned alongside or even below beam axle 12.

In this regard it should be noted that in embodiments wherein the spring member 30 (i.e., airbag 32) is positioned slightly behind beam axle 12, as shown in FIGS. 1, 2, and 5, suspension system 10 may dispense with the need for the vehicle to use a weight-distributing trailer hitch. That is, because airbag 32 is located closer to rear shackle mount 46, the lift forces applied by airbag 32 will be closer to the rear of the vehicle, counterbalancing more of the load applied by the trailer tongue and thereby reducing the amount by which the front suspension of the vehicle may be unloaded by the trailer tongue weight.

Figure 6:
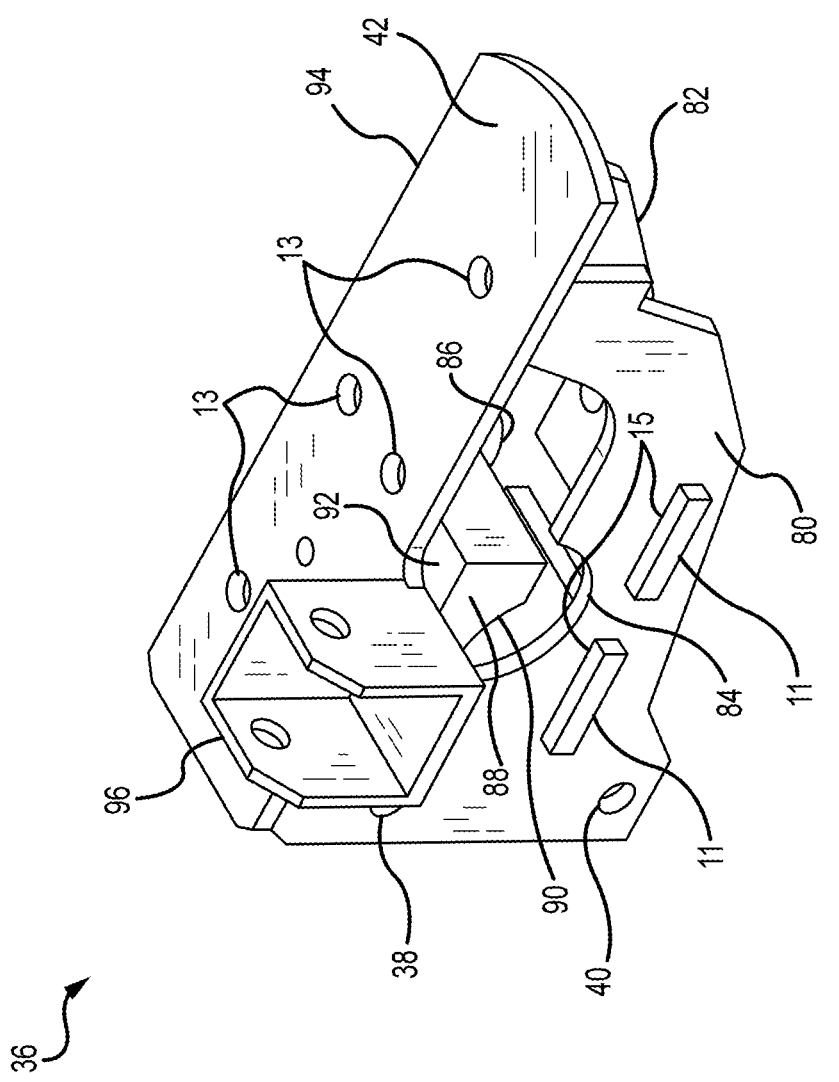
FIG. 6 is an enlarged perspective view of one embodiment of a right side axle mount assembly and optional panhard rod mounting bracket.
Figure 7:
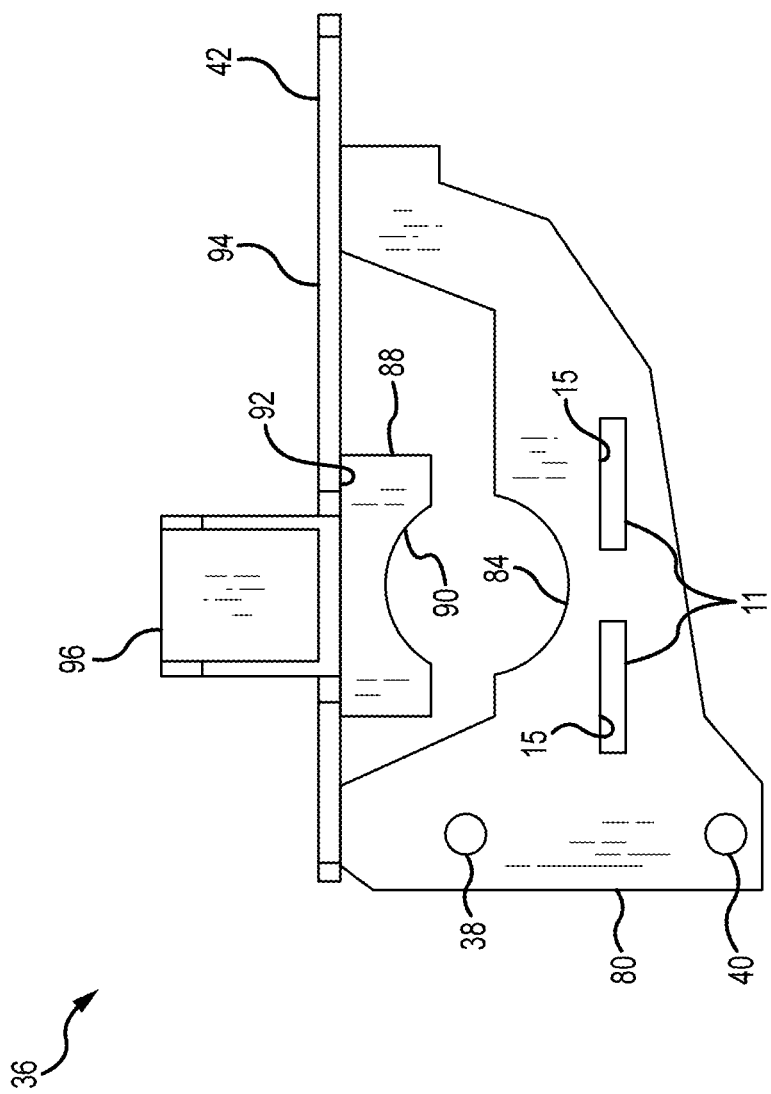
FIG. 7 is an inboard side view in elevation of the right side axle mount assembly illustrated in FIG. 6.

Referring now primarily to FIGS. 2, 6, and 7, each suspension assembly 20 and 22 may also include an axle mount assembly 36. Axle mount assembly 36 mounts to axle 12 and provides mounting locations for at least one of lower control arm 26, axle wrap control arm 28, and spring member 30 . . . . In the particular embodiments shown and described herein, each axle mount assembly 36 may be substantially identical to the other and may comprise respective inboard and outboard axle brackets 80 and 82 that are positioned in generally parallel, spaced-apart relation. Inboard and outboard axle brackets 80 and 82 may define respective cutouts 84 and 86 sized and configured to engage a portion of beam axle 12. Together, inboard and outboard axle brackets 80 and 82 may also define first and second mounting locations 38 and 40 for receiving the proximal ends 56 and 64 of lower control arm 26 and axle wrap control arm 28, respectively. In the particular embodiments shown and described herein, first and second mounting locations 38 and 40 may comprise respective through holes sized to receive bolts 78, as best seen in FIG. 2. As already described, bolts 78 allow lower control arm 26 and axle wrap control arm 28 to be pivotally mounted to axle mount assembly 36.

Axle mount assembly 36 may also be configured to operatively engage with an axle perch 88, which may comprise a part of beam axle 12. Axle perch 88 may define a first surface 90 that is sized and configured to engage a portion of beam axle 12. In a typical arrangement, axle perch 88 is fixedly attached, e.g., by a weldment, to beam axle 12. Upper mounting plate 94 is sized and configured to engage or receive a second surface or upper surface 92 of axle perch 88. Upper mounting plate 94 may also define a spring seat 42 sized and configured to receive spring member 30, e.g., either one or both of airbag 32 and coil spring 34. See also FIGS. 2 and 5. In some embodiments, and as will be described in further detail below, top mounting plate 94 may also include or define a mounting bracket 96 sized to receive a panhard rod 98. Axle mount assembly 36 may also comprise at least one lower mounting plate 11. Upper and lower mounting plates 94 and 11 may be provided with a plurality of holes 13 therein sized to receive bolts 78, thereby allowing axle mount assembly 34 to be mounted to beam axle 12 and axle perch 88, as best seen in FIGS. 2 and 5. In the particular embodiments shown and described herein, lower mounting plates 11 are configured to be slidably received by corresponding slots 15 provided in inboard and outboard axle brackets 80 and 82 to allow axle mount assembly 36 to be mounted to beam axle 12. Alternatively, other mounting arrangements could be used, as would become apparent to persons having ordinary skill in the art after having become familiar with the teachings provided herein.

Axle mount assembly 36 may be designed and fabricated from any of a wide range of materials and fabrication processes now known in the art or that may be developed in the future that are (or would be) capable of providing axle mount assembly 36 with the desired levels of strength and rigidity to minimize strain or flexure of axle mount assembly 36 during expected suspension travel and loadings. The various members 80, 82, 88, 94, 96, and 11 may be fabricated from any of a wide range of materials, such as steel and aluminum alloys. In some embodiments, axle mount assembly 36 may comprise a built-up structure or weldment fabricated from individual pieces of material that are welded together. In other embodiments, some or all of the various members comprising axle mount assembly 36 may be formed by stamping, forging, or casting, again from any of a wide range of materials. Consequently, the disclosed instrumentalities should not be regarded as limited to axle mount assemblies 36 made from any particular materials by any particular process.

The various members comprising suspension assemblies 20, 22 may be provided as a retrofit kit to allow a user to replace an OEM leaf spring suspension system with the adjustable rate suspension system 10. Alternatively, suspension system 10, i.e., comprising suspension assemblies 20 and 22, may be installed before a leaf spring suspension system is installed. If suspension system 10 is provided as a retrofit kit, a first step in the installation process would be to remove the existing leaf spring suspension system. Thereafter, the right and left suspension assemblies 20 and 22 may be installed to re-mount beam axle 12 to vehicle frame system 14. For example, and with reference primarily to FIG. 2, left side suspension assembly 22 may be mounted to vehicle frame system 14 by mounting distal end 44 of upper load beam 24 to shackle mount 46 provided on left frame rail 18 via shackle 48. Bolt 78 sized to rotate within bushing 74 provided on distal end 44 of upper load beam 24 may be used for this purpose. If used, axle mount assembly 36 may be mounted to beam axle 12 by bolts 78. Thereafter, spring member 30, e.g., air bag 32 and optional coil spring 34 may be positioned between seat 42 defined by upper mounting plate 94 of axle mount assembly 36 and upper load beam 24, e.g., engaging spring seat 17 of upper load beam 24. Proximal end 56 of lower control arm 26 then may be pivotally mounted to first mounting location 38 defined by axle mount assembly 36 by bolt 78. Similarly, distal end 58 of lower control arm 26 may be pivotally mounted to mounting eye 60 provided on frame system 14 (e.g., frame rail 16) by bolt 78. Mounting location 62 defined by lower control arm 26 may be pivotally mounted to first mounting location 52 defined by proximal end 50 of upper load beam 24, again by bolt 78. Proximal end 64 of axle wrap control arm 28 may be pivotally mounted by bolt 78 to second mounting location 40 defined by axle mount assembly 36. Similarly, distal end 66 of axle wrap control arm 28 may be pivotally mounted by bolt 78 to second mounting location 54 defined by proximal end 50 of upper load beam 24. Right side suspension assembly 20 may be mounted in a similar manner.

In some embodiments, suspension system 10 may further comprise a panhard rod 98 mounted to beam axle 12 and frame system 14. Panhard rod 98 provides additional lateral stability to suspension system 10 by limiting transverse movement of beam axle 12. A first end of panhard rod 98 may be mounted to mounting bracket 96 provided on upper mounting plate 94 of axle mount assembly 36, whereas a second end of panhard rod 98 may be mounted to left frame rail 18, as best seen in FIGS. 1 and 5. Alternatively, the mounting arrangement could be reversed, with the first end of panhard rod 98 being mounted to the right frame rail 16 and the second end being mounted to mounting bracket (not specifically shown) provided on the left side suspension assembly, as would become apparent to persons having ordinary skill in the art after having become familiar with the teachings provided herein. Optionally, and in other embodiments, a roll bar (not shown) may be mounted to beam axle and frame system 14 to provide additional roll stability, as would become apparent to persons having ordinary skill in the art. In addition to, or as a substitute for, a roll bar, one or more torsion bars connected between each end of beam axle 12 and vehicle frame system 14 may be used to provide additional roll stability. In still other embodiments, and in particular embodiments utilizing airbags 32 as spring members 30, additional roll stability could be provided by varying the internal pressure of airbags 32 or by providing the suspension system 10 with variable rate dampers or shock absorbers.

Unless defined otherwise, all technical and scientific terms used herein have the same meaning as commonly understood by persons having ordinary skill in the art to which the invention pertains. Although any methods and materials similar or equivalent to those described herein can be used in practice for testing of the present invention, the preferred materials and methods are described herein.

In understanding the scope of the present invention, the articles "a" and "an" are used herein to refer to one or to more than one (i.e., to at least one) of the grammatical object of the article. By way of example, "an element" means one element or more than one element. The term "comprising" and its derivatives, as used herein, are intended to be open ended terms that specify the presence of the stated features, elements, components, groups, and/or steps, but do not exclude the presence of other unstated features, elements, components, groups, and/or steps. The foregoing also applies to words having similar meanings such as the terms, "including," "having" and their derivatives. Any terms of degree such as "substantially," "about" and "approximate" as used herein mean a reasonable amount of deviation of the modified term such that the end result is not significantly changed. When referring to a measurable value, such as an amount, a temporal duration, and the like, these terms are meant to encompass variations of at least ±20% or ±10%, more preferably ±5%, even more preferably ±1%, and still more preferably ±0.1% from the specified value, as such variations are appropriate and as would be understood by persons having ordinary skill in the art to which the invention pertains.

Throughout this disclosure, various aspects of the invention may be presented in a range format. It should be understood that the description in a range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.6, 3, 4, 5, 5.7, and 6. This applies regardless of the breadth of the range.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Moreover, the disclosed instrumentalities include all possible combinations and permutations of the disclosed features, elements, and limitations, as would become apparent to persons having ordinary skill in the art after having become familiar with the teachings provided herein. Components that are shown directly connected or contacting each other can have intermediate structures disposed between them. The functions of one element can be performed by two, and vice versa. The structures and functions of one embodiment can be adapted to another embodiment. It should be noted that while the present invention is shown and described herein as it could be used in conjunction with a configuration of various components, it could be utilized with other configurations, either now known in the art or that may be developed in the future, so long as the objects and features of the invention are achieved, as would become apparent to persons having ordinary skill in the art after having become familiar with the teachings provided herein. Consequently, the present invention should not be regarded as limited to that shown and described herein. It is not necessary for all advantages to be present in a particular embodiment at the same time. Thus, the foregoing descriptions of the embodiments according to the present invention are provided for illustration only, and not for the purpose of limiting the invention as defined by the appended claims and their equivalents.

Having herein set forth preferred embodiments of the present invention, it is anticipated that suitable modifications can be made thereto which will nonetheless remain within the scope of the invention. The invention shall therefore only be construed in accordance with the following claims:

The invention claimed is:

1. A retrofit kit for replacing an existing leaf spring suspension system, the existing leaf spring suspension system mounting a beam axle to a vehicle, the retrofit kit comprising:
   an upper load beam having a proximal end and a distal end, the proximal end of said upper load beam defining first and second mounting locations in spaced-apart relation, the distal end of said upper load beam being configured to pivotally mount to the vehicle;
   a lower control arm having a proximal end, a distal end, and a mounting location positioned between the proximal end distal ends, the distal end of said lower control arm being configured to pivotally engage a mounting eye provided on the vehicle, the mounting location being configured to pivotally engage with the first mounting location defined by the proximal end of said upper load beam; and
   an axle wrap control arm having a proximal end and a distal end, the distal end of said axle wrap control arm being configured to pivotally engage with the second mounting location defined by the proximal end of said upper load beam.

2. The retrofit kit of claim 1, further comprising an axle mount configured to mount to the beam axle, said axle mount defining first and second mounting locations in spaced-apart relation, the first mounting location being configured to pivotally engage with the proximal end of said lower control arm, the second mounting location being configured to pivotally engage with the proximal end of said axle wrap control arm.

3. The retrofit kit of claim 2, further comprising at least one spring member configured to be mounted to said axle mount and said upper load beam.

4. The retrofit kit of claim 3, wherein said at least one spring member is configured to be received between said axle mount and said upper load beam.

5. The retrofit kit of claim 3, wherein said at least one spring member comprises one or more selected from the group consisting of an airbag and a coil spring.

6. The retrofit kit of claim 2, wherein said axle mount further comprises:
   a top mounting plate configured to engage at least a portion of an axle perch provided on the beam axle;
   an inboard axle bracket defining a first cutout configured to engage a portion of the beam axle;
   an outboard axle bracket positioned a spaced-distance from said inboard axle bracket, said outboard axle bracket defining a first cutout configured to engage a portion of the beam axle, said inboard and outboard axle brackets together defining the first and second mounting locations of said axle mount; and
   a least one lower mounting plate mounted to said inboard and outboard axle brackets.

7. The retrofit kit of claim 2, further comprising a panhard rod having a first end configured to be pivotally mounted to the vehicle and a second end configured to be pivotally mounted to said axle mount.

8. The retrofit kit of claim 1, further comprising a shackle having a first end and a second end, the first end of said shackle being configured to pivotally engage the distal end of said upper load beam, the second end of said shackle being configured to pivotally engage a shackle mount provided on the vehicle.

9. A method of retrofitting an existing leaf spring suspension system, the existing leaf spring suspension system mounting a beam axle to a vehicle, the method of retrofitting comprising:
   removing from the vehicle and the beam axle a right side leaf spring of the existing leaf spring suspension system;
   pivotally mounting a proximal end of a first lower control arm to a right side of the beam axle;
   pivotally mounting a distal end of the first lower control arm to a right side mounting eye provided on the vehicle;
   pivotally mounting a proximal end of a first axle wrap control arm to a right side of the beam axle;
   pivotally mounting a first mounting location defined by a proximal end of a first upper load beam to the first lower control arm at a position between the proximal end and the distal end of the first lower control arm;
   pivotally mounting a second mounting location defined by the proximal end of the first upper load beam to a distal end of the first axle wrap control arm;
   pivotally mounting a distal end of the first upper load beam to a first end of a first shackle, a second end of the first shackle being pivotally mounted to a right side shackle mount provided on the vehicle; and
   mounting a first spring member to the beam axle and the first upper load beam.

10. The method of claim 9, further comprising:
   removing from the vehicle and the beam axle a left side leaf spring of the existing leaf spring suspension system;

pivotally mounting a proximal end of a second lower control arm to a left side of the beam axle;

pivotally mounting a distal end of the second lower control arm to a left side mounting eye provided on the vehicle;

pivotally mounting a proximal end of a second axle wrap control arm to the left side of the beam axle;

pivotally mounting a first mounting location defined by a proximal end of a second upper load beam to the second lower control arm at a position between the proximal end and the distal end of the second lower control arm;

pivotally mounting a second mounting location defined by the proximal end of the second upper load beam to a distal end of the second axle wrap control arm;

pivotally mounting a distal end of the second upper load beam to a first end of a second shackle, a second end of the second shackle being pivotally mounted to a left side shackle mount provided on the vehicle; and mounting a second spring member to the beam axle and the second upper load beam.

11. The method of claim 10, further comprising:

mounting a first axle mount to the right side of the beam axle, the first axle mount being configured to pivotally receive the proximal end of the first lower control arm and the proximal end of the first axle wrap control arm; and mounting a second axle mount to the left side of the beam axle, the second axle mount being configured to pivotally receive the proximal end of the second lower control arm and the proximal end of the second axle wrap control arm.

12. The method of claim 11, further comprising:

pivotally mounting a first end of a panhard rod to the vehicle; and pivotally mounting a second end of the panhard rod to the beam axle.

13. A suspension system for mounting a beam axle to a vehicle, comprising:

a right side lower control arm having a proximal end, a distal end, and a mounting location positioned between the proximal and distal ends, the proximal end of said right side lower control arm being pivotally mounted to a right side of the beam axle, the distal end of said lower control arm being pivotally mounted to a right side mounting eye provided on the vehicle;

a right side axle wrap control arm having a proximal end and a distal end, the proximal end of said right side axle wrap control arm being pivotally mounted to the right side of the beam axle;

a right side upper load beam having a proximal end and a distal end, the proximal end of said right side upper load beam defining first and second mounting locations in spaced-apart relation, the first mounting location of said right side upper load beam being pivotally mounted to the mounting location of said right side lower control arm, the second mounting location of said right side upper load beam being pivotally mounted to the distal end of said right side axle wrap control arm;

a right side shackle having a first end and a second end, the first end of said right side shackle being pivotally mounted to the distal end of said right side upper load beam, the second end of said right side shackle being pivotally mounted to a right side shackle mount provided on the vehicle;

a right side spring member mounted to the right side of the beam axle and the right side upper load beam;

a left side lower control arm having a proximal end, a distal end, and a mounting location positioned between the proximal and distal ends, the proximal end of said left side lower control arm being pivotally mounted to a left side of the beam axle, the distal end of said lower control arm being pivotally mounted to a left side mounting eye provided on the vehicle;

a left side axle wrap control arm having a proximal end and a distal end, the proximal end of said left side axle wrap control arm being pivotally mounted to the left side of the beam axle;

a left side upper load beam having a proximal end and a distal end, the proximal end of said left side upper load beam defining first and second mounting locations in spaced-apart relation, the first mounting location of said left side upper load beam being pivotally mounted to the mounting location of said left side lower control arm, the second mounting location of said left side upper load beam being pivotally mounted to the distal end of said left side axle wrap control arm;

a left side shackle having a first end and a second end, the first end of said left side shackle being pivotally mounted to the distal end of said left side upper load beam, the second end of said left side shackle being pivotally mounted to a left side shackle mount provided on the vehicle; and a left side spring member mounted to the left side of the beam axle and the left side upper load beam.

14. The suspension system of claim 13, further comprising:

a right side axle mount mounted to the right side of the beam axle, said right side axle mount defining first and second mounting locations in spaced-apart relation, the first mounting location being pivotally mounted to the proximal end of said right side lower control arm, the second mounting location being pivotally mounted to the proximal end of said right side axle wrap control arm; and a left side axle mount mounted to the left side of the beam axle, said left side axle mount defining first and second mounting locations in spaced-apart relation, the first mounting location being pivotally mounted to the proximal end of said left side lower control arm, the second mounting location being pivotally mounted to the proximal end of said left side axle wrap control arm.

15. The suspension system of claim 14, wherein each of said right and left side axle mounts further comprises:

an upper mounting plate configured to engage at least a portion of an axle perch provided on the beam axle;

an inboard axle bracket mounted to said upper mounting plate, said inboard axle bracket defining a first cutout configured to engage a portion of the beam axle;

an outboard axle bracket mounted to said upper mounting plate in generally parallel, spaced apart relation to said inboard axle bracket, said outboard axle bracket defining a first cutout configured to engage a portion of the beam axle, said inboard and outboard axle brackets together defining the first and second mounting locations of said axle mount; and a least one lower mounting plate mounted to said inboard and outboard axle brackets.

16. The suspension system of claim 15, wherein the axle perch is mounted to an upper portion of the beam axle and wherein said inboard and outboard axle brackets are mounted to a lower portion of the beam axle so that the beam axle is located substantially between the axle perch and said inboard and outboard axle brackets.

17. The suspension system of claim 16, wherein said right side spring member is disposed between the top mounting plate of said right side axle mount and said right side upper load beam and wherein said left side spring member is disposed between the top mounting plate of said left side axle mount and said left side upper load beam.

18. The suspension system of claim 17, wherein said right side spring member is located substantially in line with said beam axle and wherein said left side spring member is located substantially in line with said beam axle.

19. The suspension system of claim 18, wherein said right side spring member is located at a position behind said beam axle and wherein said left side spring member is located at a position behind said beam axle.

20. The suspension system of claim 13, wherein said right side spring member comprises a coil spring and an airbag and wherein said left side spring member comprises a coil spring and an airbag.

21. The suspension system of claim 13, further comprising a panhard rod having a first end pivotally mounted to the vehicle and a second end pivotally mounted to the beam axle.

* * * * *